United States Patent
Li et al.

(10) Patent No.: US 11,916,249 B2
(45) Date of Patent: Feb. 27, 2024

(54) COVER ASSEMBLY OF SECONDARY BATTERY AND SECONDARY BATTERY

(71) Applicant: CONTEMPORARY AMPEREX TECHNOLOGY CO., LIMITED, Ningde (CN)

(72) Inventors: Quankun Li, Ningde (CN); Shiyao Zhang, Ningde (CN); Peng Wang, Ningde (CN); Zhanyu Sun, Ningde (CN); Siying Huang, Ningde (CN); Jinmei Xu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 195 days.

(21) Appl. No.: 17/134,012

(22) Filed: Dec. 24, 2020

(65) Prior Publication Data

US 2021/0119300 A1  Apr. 22, 2021

Related U.S. Application Data (63) Continuation of application No. PCT/CN2020/102827, filed on Jul. 17, 2020.

(30) Foreign Application Priority Data

Aug. 15, 2019 (CN) .......................... 201921326582.7

(51) Int. Cl.
*H01M 50/342* (2021.01)
*H01M 50/148* (2021.01)

(52) U.S. Cl.
CPC ....... *H01M 50/342* (2021.01); *H01M 50/148* (2021.01); *H01M 2200/10* (2013.01)

(58) Field of Classification Search
CPC ............. H01M 50/342; H01M 50/148; H01M 2200/10; H01M 50/184; H01M 50/186;
(Continued)

(56) References Cited

U.S. PATENT DOCUMENTS

2006/0073375 A1  4/2006  Hong et al.
2019/0181408 A1*  6/2019  Jang .................... H01M 50/375

FOREIGN PATENT DOCUMENTS

CN  201673952 U  * 12/2010
CN  206610837 U    11/2017
(Continued)

OTHER PUBLICATIONS

Centroplast Engineering Plastics GMBH, MatWeb Material Property Data, retrieved Sep. 1, 2022, from https://www.matweb.com/search/datasheet.aspx?matguid=0a9af43d760941a19f1f7391b6cc5e33&ckck=1 (Year: 2022).*

(Continued)

*Primary Examiner* — Matthew T Martin
*Assistant Examiner* — Bartholomew A Hornsby
(74) *Attorney, Agent, or Firm* — XSENSUS LLP (57) ABSTRACT

This application relates to a cover assembly of a secondary battery. The cover assembly includes a cover plate with an air hole; a blocker inserted into and blocking the air hole; a sealing member disposed between the blocker and the cover plate configured to seal a gap between the blocker and the cover plate; and a fastener disposed inside the air hole. The fastener is connected to the cover plate, the blocker is connected to the cover plate through the fastener. The fastener is configured to deform in response to a temperature rise, so that the blocker stops blocking the air hole. The blocker stops blocking the air hole as a temperature inside a housing rises, to discharge gas from the housing through the air hole. In this way, the secondary battery can be prevented
(Continued)

from an explosion, while partial heat is taken away through gas discharge.

20 Claims, 7 Drawing Sheets (58) Field of Classification Search
CPC ............ H01M 50/193; H01M 50/159; H01M 50/308; H01M 50/325; H01M 50/358; H01M 50/367; H01M 2220/10; H01M 50/375; H01M 50/15; Y02E 60/10
See application file for complete search history.

(56) References Cited

FOREIGN PATENT DOCUMENTS

| | | | |
|---|---|---|---|
| CN | 208111552 U | | 11/2018 |
| CN | 109817853 A | | 5/2019 |
| CN | 109980149 A | | 5/2019 |
| CN | 109980149 A | * 7/2019 | ............ H01G 11/14 |
| CN | 110429214 A | | 11/2019 |
| CN | 209981287 U | | 1/2020 |
| EP | 3772761 A1 | | 2/2021 |
| EP | 3772762 A1 | | 2/2021 |
| JP | 2017091721 A | | 5/2017 |
| WO | WO2016/059618 A1 | | 4/2016 |

OTHER PUBLICATIONS

Dell replacement Lithium ion retrieved on Sep. 1, 2022, from https://www.dell.com/en-us/shop/dell-4-cell-55-wh-lithium-ion-replacement-battery-for-select-laptops/apd/451-bbsy/pc-accessories. (Year: 2022).*
Centroplast Engineering Plastics GMBH. (Year: 2022).*
Dell replacement Lithium ion retrieved on Sep. 1, 2022 https://www.dell.com/en-us/shop/dell-4-cell-55-wh-lithium-ion-replacement-battery-for-select-laptops/apd/451-bbsy/pc-accessories. (Year: 2022).*
Contemporary Amperex Technology Co., Limited, International Search Report and Written Opinion, PCTCN2020102827, dated Oct. 27, 2020, 18 pgs.
Contemporary Amperex Technology Co., Limited, Extended European Search Report, EP20827974.5, dated Jun. 16, 2021, 6 pgs.

* cited by examiner

COVER ASSEMBLY OF SECONDARY BATTERY AND SECONDARY BATTERY

CROSS REFERENCE TO RELATED APPLICATIONS

This application is a continuation application of PCT Patent Application No. PCT/CN2020/102827, entitled "COVER ASSEMBLY OF SECONDARY BATTERY AND SECONDARY BATTERY" filed on Jul. 17, 2020, which claims priority to Chinese Patent Application No. 201921326582.7, filed with the State Intellectual Property Office of the People's Republic of China on Aug. 15, 2019, and entitled "COVER ASSEMBLY OF SECONDARY BATTERY AND SECONDARY BATTERY", all of which are incorporated herein by reference in their entirety.

TECHNICAL FIELD

Embodiments of this application relate to the technical field of energy storage devices, and in particular, to a cover assembly of a secondary battery and a secondary battery.

BACKGROUND

Safety performance is extremely important for a secondary battery that serves as an important component of a new energy vehicle. During charging and discharging of the secondary battery, gas may be generated inside the secondary battery, and excessively high air pressure may cause an explosion of the secondary battery. Therefore, an explosion-proof valve based on air pressure control can be disposed on a cover plate of the secondary battery.

A plurality of secondary batteries usually need to be arranged into a battery module for use because one secondary battery has a small capacity or power. Once thermal runaway occurs in one secondary battery of the battery module, generated heat is quickly transferred to other secondary batteries in the battery module to cause thermal runaway in the other secondary batteries, resulting in a sharp rise in temperature and air pressure. During thermal runaway, the existing explosion-proof valve based on air pressure control has a risk of failing to release the pressure in a timely manner and resulting in an explosion of the secondary battery.

Therefore, it is necessary to design a new secondary battery to resolve the foregoing problem and improve safety performance of secondary batteries.

SUMMARY

This application provides a cover assembly of a secondary battery, a secondary battery and an electric apparatus including the secondary battery from various aspects to resolve the problem in the prior art and improve safety performance of secondary batteries.

A first aspect of this application provides a cover assembly of a secondary battery, including:
a cover plate with an air hole;
a blocker inserted into and blocking the air hole;
a sealing member disposed between the blocker and the cover plate, surrounding the air hole, and configured to seal a gap between the blocker and the cover plate; and
a fastener disposed inside the air hole, where the fastener is connected to the cover plate, the blocker is connected to the cover plate through the fastener, and the fastener is configured to deform in response to a temperature rise, so that the blocker stops blocking the air hole.

In a possible design, a melting point of the fastener ranges from 80° C. to 200° C., and the blocker is a metal block.

In a possible design, the blocker includes a body and a connection portion;
the body is flat-plate shaped, and the body completely covers the air hole and is located on an outer side of the cover plate; and
one end of the connection portion is connected to the body, and the other end of the connection portion extends into the air hole and is connected to the fastener.

In a possible design, the blocker further includes a limiting element;
the limiting element is connected to an end of the connection portion facing away from the body;
a limiting step is disposed on a side of the fastener facing away from the body; and
the limiting element abuts against the limiting step.

In a possible design, both the connection portion and the limiting element have an annular structure; and
an outer diameter of the limiting element is greater than an outer diameter of the connection portion.

In a possible design, a projection of the limiting element along a thickness direction Z of the cover assembly is within a projection of the air hole along the thickness direction Z of the cover assembly.

In a possible design, an annular sink is provided in the cover plate;
the sink surrounds the air hole and extends along a radial direction of the air hole; and
the body is accommodated in the sink.

In a possible design, an annular groove is provided in the cover plate;
the groove surrounds the air hole and recesses from a bottom surface of the sink towards a side facing away from the body; and
at least a part of the sealing member is accommodated in the groove.

In a possible design, the cover assembly further includes an insulation plate, and the insulation plate is disposed on an inner side of the cover plate; and
the fastener and the insulation plate are integrally formed.

A second aspect of this application provides a secondary battery, including:
a housing with an opening;
an electrode assembly accommodated in the housing; and
the cover assembly according to any one of the foregoing designs, where the cover assembly covers the opening of the housing to contain the electrode assembly inside the housing.

According to the cover assembly of a secondary battery and the secondary battery described above, the blocker of the cover assembly of the secondary battery blocks the air hole, and the blocker is connected to the cover plate through the fastener. The fastener is configured to deform in response to the temperature rise, so that the blocker exits the state of blocking the air hole. The blocker no longer blocks the air hole as a temperature inside the housing of the secondary battery rises, so as to discharge gas from the housing through the air hole. In this way, the secondary battery can be prevented from an explosion because of reduced air pressure inside the housing, while partial heat can be taken away through gas discharge, thereby slowing down thermal runaway in the secondary battery and providing enough escaping time for passengers.

The sealing member is disposed between the blocker and the cover plate, surrounding the air hole and configured to seal the gap between the blocker and the cover plate, thereby improving sealing performance of the blocker to protect the secondary battery in a normal working state from electrolyte leakage and prevent external water vapor from entering the housing, and further improving the safety performance and service life of the secondary battery.

The blocker extends into and blocks the air hole, and the fastener is disposed inside the air hole; therefore, the blocker can securely block the air hole and is not prone to falling off in a case of no thermal runaway in the secondary battery. Moreover, no additional fastening object such as a press block is required to secure the blocker, reducing occupation space and improving energy density of the secondary battery.

A third aspect of this application provides an electric apparatus including the aforementioned secondary battery.

It should be understood that the foregoing general descriptions and the following detailed descriptions are merely examples, and do not constitute any limitation on this application.

BRIEF DESCRIPTION OF DRAWINGS

To describe the technical solutions in specific implementations of this application or the prior art more clearly, the following briefly describes the accompanying drawings required for describing the specific implementations or the prior art. Apparently, the accompanying drawings in the following description show merely some implementations of this application, and a person of ordinary skill in the art may still derive other drawings from these accompanying drawings without creative efforts.

REFERENCE NUMERALS 100. secondary battery;
  1. cover assembly;
    11. cover plate;
      111. explosion-proof hole;
      112. air hole;
      113. groove;
      114. sink;
    12. explosion-proof sheet;
    13. blocker;
      131. body;
      132. connection portion;
      133. limiting element;
    14. sealing member;
    15. fastener;
      151. limiting step;
    16. insulation plate;
    17. electrode terminal;
  2. housing;
  3. electrode assembly; and
  4. adapting sheet.

The accompanying drawings herein are incorporated into and constitute a part of the specification. They show embodiments that conform to this application, and are used in combination with the specification to explain rationale of this application.

DESCRIPTION OF EMBODIMENTS

The following clearly describes the technical solutions in this application with reference to the accompanying drawings. Apparently, the described embodiments are some but not all of the embodiments of this application. All other embodiments obtained by a person of ordinary skill in the art based on the embodiments of this application without creative efforts fall within the protection scope of this application.

The terms used in the embodiments of this application are merely for the purpose of illustrating specific embodiments, and are not intended to limit this application. The terms "a", "the" and "this" of singular forms used in the embodiments and the appended claims of this application are also intended to include plural forms, unless otherwise specified in the context clearly.

It should be understood that in this specification, the term "and/or" is only an associative relationship for describing associated objects, indicating that three relationships may exist. For example, A and/or B may indicate three situations: A exists independently; A and B exist simultaneously; and B exists independently. In addition, the character "/" in this specification generally indicates an "or" relationship between contextually associated objects.

It should be noted that the directional terms such as "up", "down", "left", and "right" described in the embodiments of this application are described as seen from the angles shown in the accompanying drawings, and should not be understood as a limitation to the embodiments of this application. In addition, in the context, it should be further understood that when an element is referred to as being "above" or "under" another element, the element can not only be directly connected "above" or "under" the another element, but also be indirectly connected "above" or "under" the another element through an intermediate element.

Figure 1:
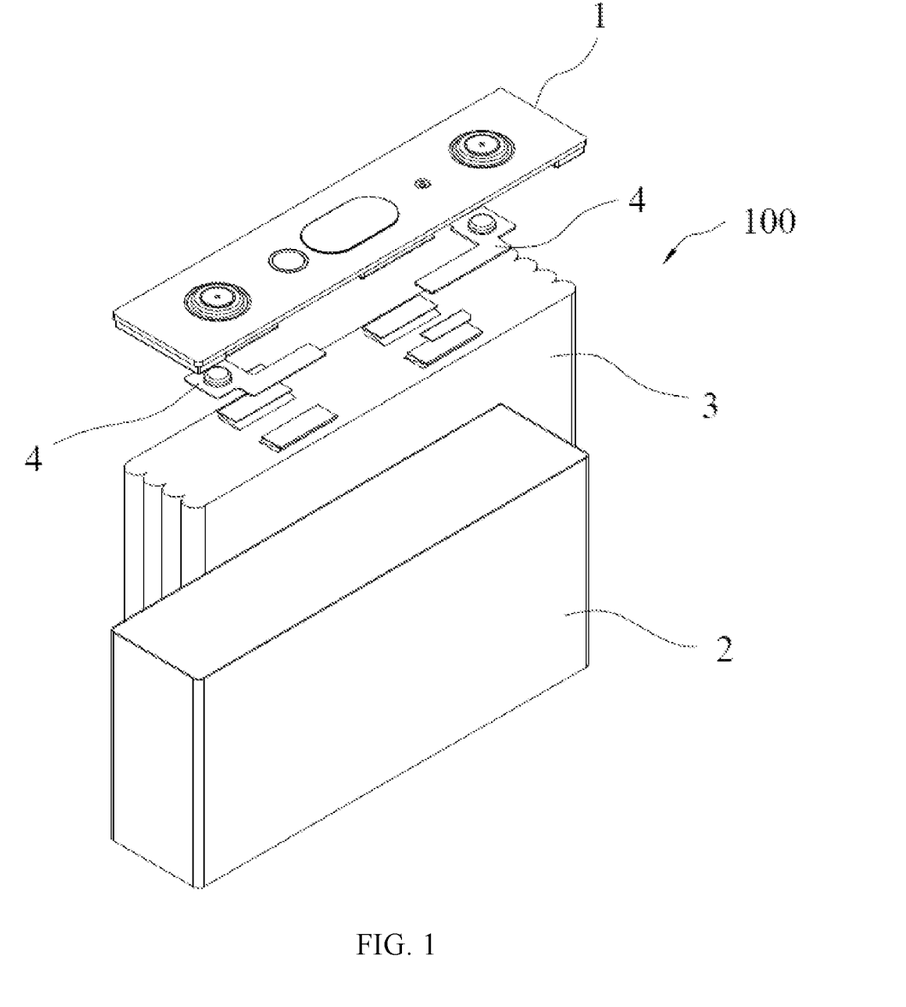
FIG. 1 is a schematic structural diagram of a secondary battery according to an embodiment of this application.
Figure 2:
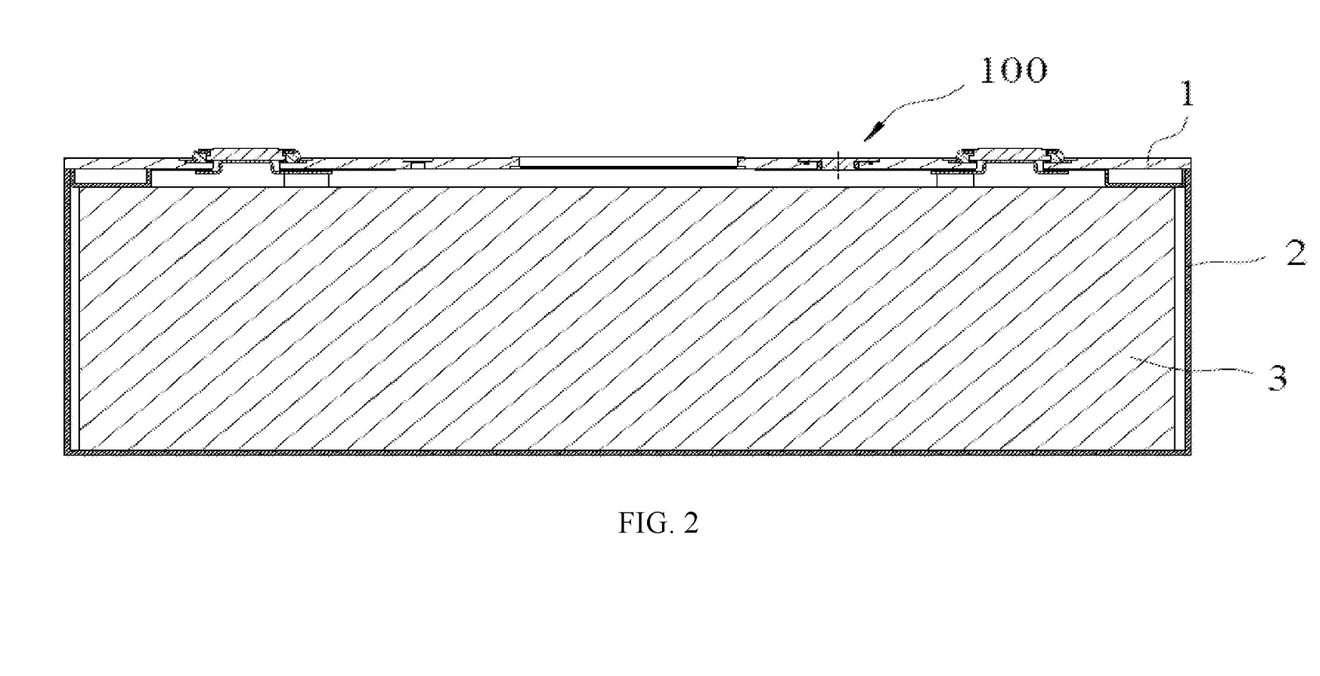
FIG. 2 is a main cross-sectional view of a structure of a secondary battery according to an embodiment of this application.

FIG. 1 is a schematic structural diagram of a secondary battery according to an embodiment of this application. FIG. 2 is a main cross-sectional view of a structure of a secondary battery according to an embodiment of this application. As shown in FIGS. 1 and 2, the embodiments of this application provide a secondary battery 100, including a housing 2, an electrode assembly 3, and a cover assembly 1.

The housing 2 may be of a hexahedron shape or another shape, and an accommodating cavity is formed inside the housing 2 to accommodate the electrode assembly 3 and an electrolyte. An opening is provided at one end of the housing 2, so that the electrode assembly 3 can be placed in the accommodating cavity of the housing 2 through the opening. A plurality of electrode assemblies 3 may be disposed in the accommodating cavity, and the plurality of electrode assemblies 3 are stacked. The housing 2 may be made of a metal material, such as aluminum or aluminum alloy, or may be made of an insulation material, such as plastic.

The electrode assembly 3 includes an electrode unit and a tab. The electrode unit includes a negative electrode plate, a positive electrode plate, and a separator. The separator is located between the negative electrode plate and the positive electrode plate that are adjacent to each other, to separate the negative electrode plate from the positive electrode plate.

In a possible design, the negative electrode plate, the separator, and the positive electrode plate are sequentially stacked and wound to form the electrode unit of the electrode assembly 3, that is, the electrode unit has a winding structure. In another possible design, the negative electrode plate, the separator, and the positive electrode plate are sequentially stacked to form the electrode unit of the electrode assembly 3, that is, the electrode unit has a stack structure. There is a gap in the formed electrode unit. The electrolyte is able to enter the electrode unit through the gap to immerse the negative electrode plate and the positive electrode plate.

The negative electrode plate includes a negative electrode current collector (for example, copper foil) and a negative electrode active material layer (for example, carbon or silicon) coated on a surface of the negative electrode current collector. The positive electrode plate includes a positive electrode current collector (for example, aluminum foil) and a positive electrode active material layer (for example, a ternary material, lithium iron phosphate, or lithium cobalt oxide) coated on a surface of the positive electrode current collector. The negative tab is connected to the negative electrode plate and extends from the electrode unit. The negative tab may be directly cut from the negative electrode current collector. The positive tab is connected to the positive electrode plate and extends from the electrode unit. The positive tab may be directly cut from the positive electrode current collector.

Figure 3:
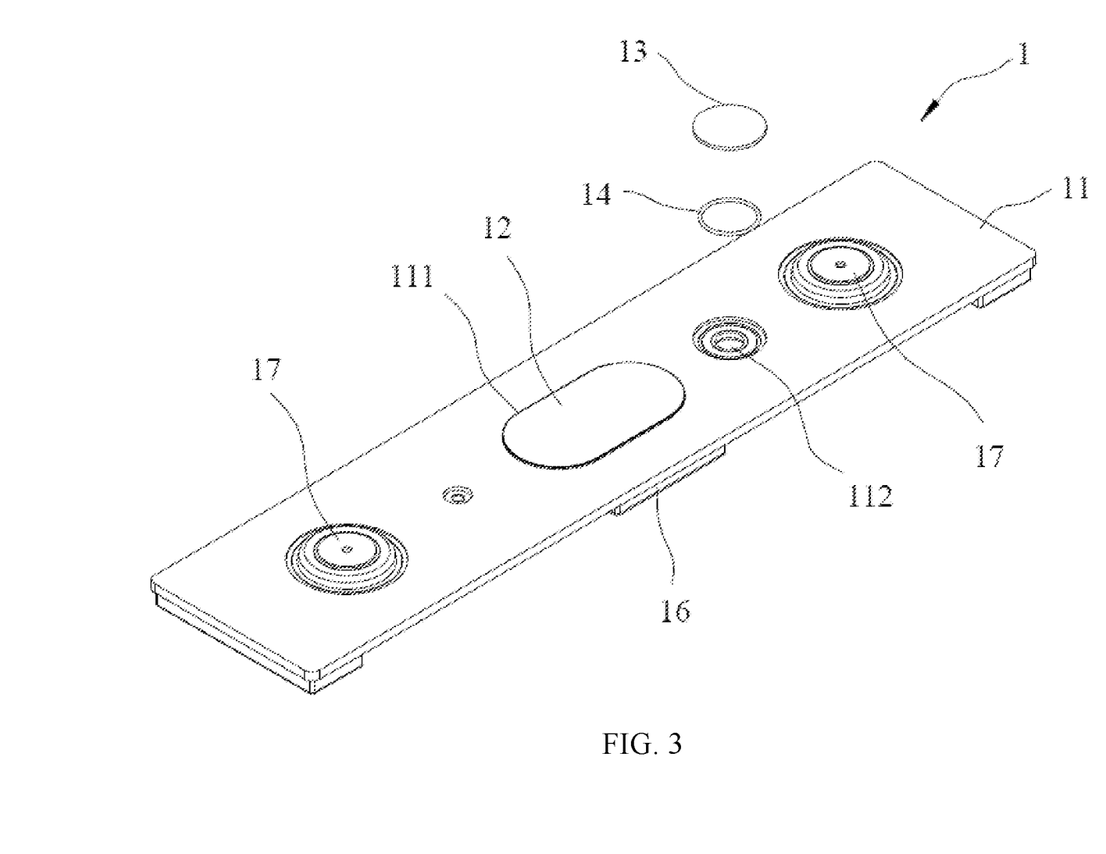
FIG. 3 is an exploded structural diagram of a cover assembly of a secondary battery according to an embodiment of this application.

FIG. 3 is an exploded structural diagram of a cover assembly of a secondary battery according to an embodiment of this application. As shown in FIGS. 1 to 3, the cover assembly 1 includes a cover plate 11 and an electrode terminal 17. The cover plate 11 is secured to the opening of the housing 2, containing the electrode assembly 3 and the electrolyte inside the accommodating cavity of the housing 2. The electrode terminal 17 is disposed on the cover plate 11 and includes a negative electrode terminal 17 and a positive electrode terminal 17. The two electrode terminals 17 and corresponding tabs are electrically connected through an adapting sheet 4. An explosion-proof hole 111 is provided in the cover plate 11, and an explosion-proof sheet 12 covers the explosion-proof hole 111.

Specifically, for the secondary battery 100 with tabs extending from the top of the electrode unit, the adapting sheet 4 is located between the electrode unit of the electrode assembly 3 and the cover plate 11. The adapting sheet 4 includes a negative adapting sheet 4 and a positive adapting sheet 4. The negative adapting sheet 4 is configured to connect the negative tab and the negative electrode terminal 17. The positive adapting sheet 4 is configured to connect the positive tab and the positive electrode terminal 17.

A plurality of the secondary batteries 100 can form a battery module. If thermal runaway occurs in one secondary battery 100 of the battery module, heat is transferred to an adjacent secondary battery 100, causing thermal runaway in surrounding secondary batteries 100.

Figure 4:
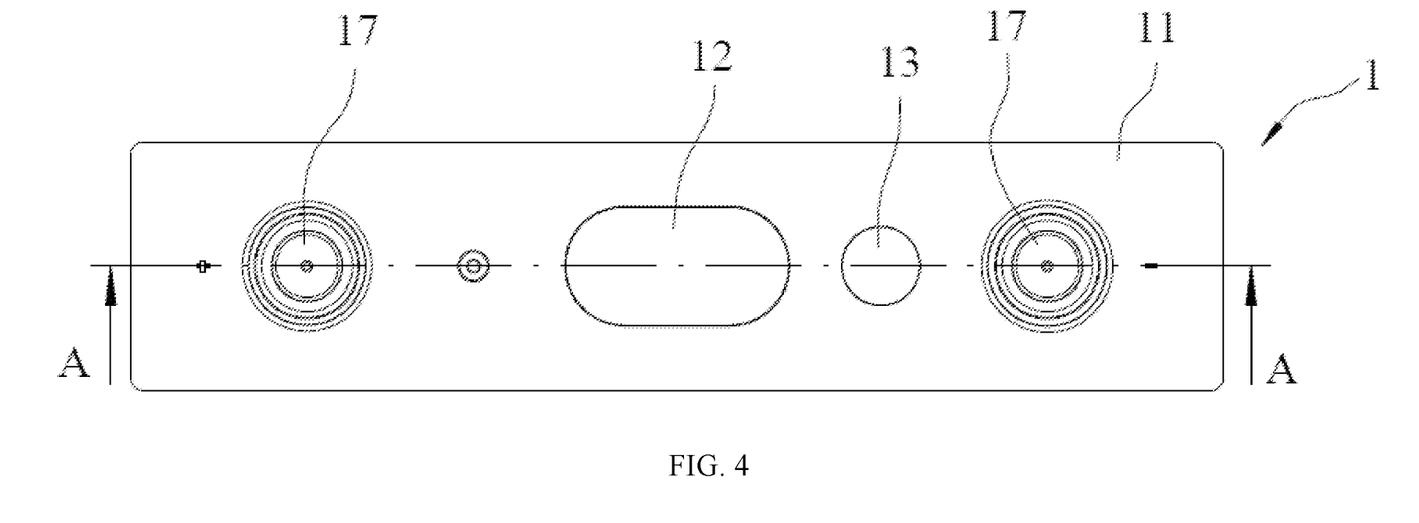
FIG. 4 is a main view of a cover assembly of a secondary battery according to an embodiment of this application.
Figure 5:
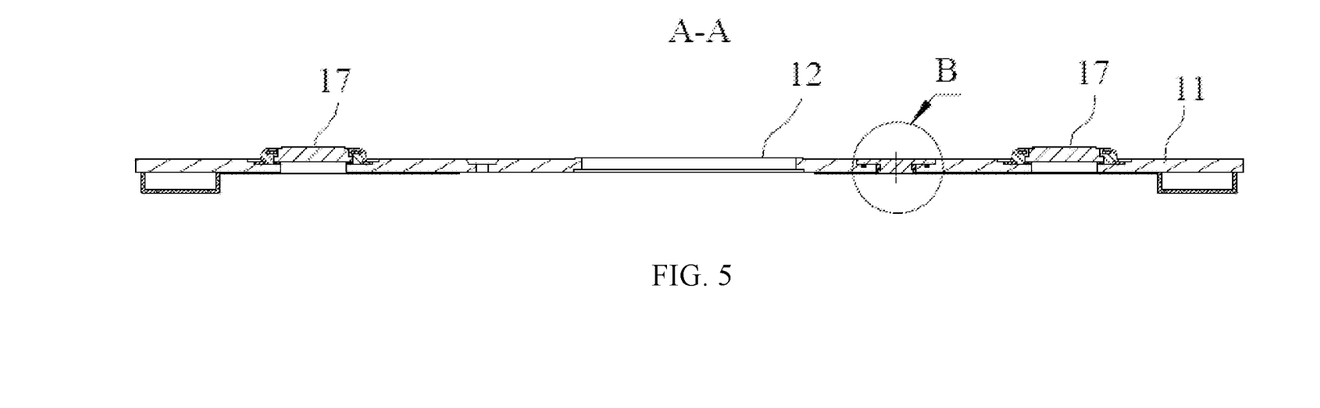
FIG. 5 is a cross-sectional view of FIG. 4 in an A-A direction.
Figure 6:
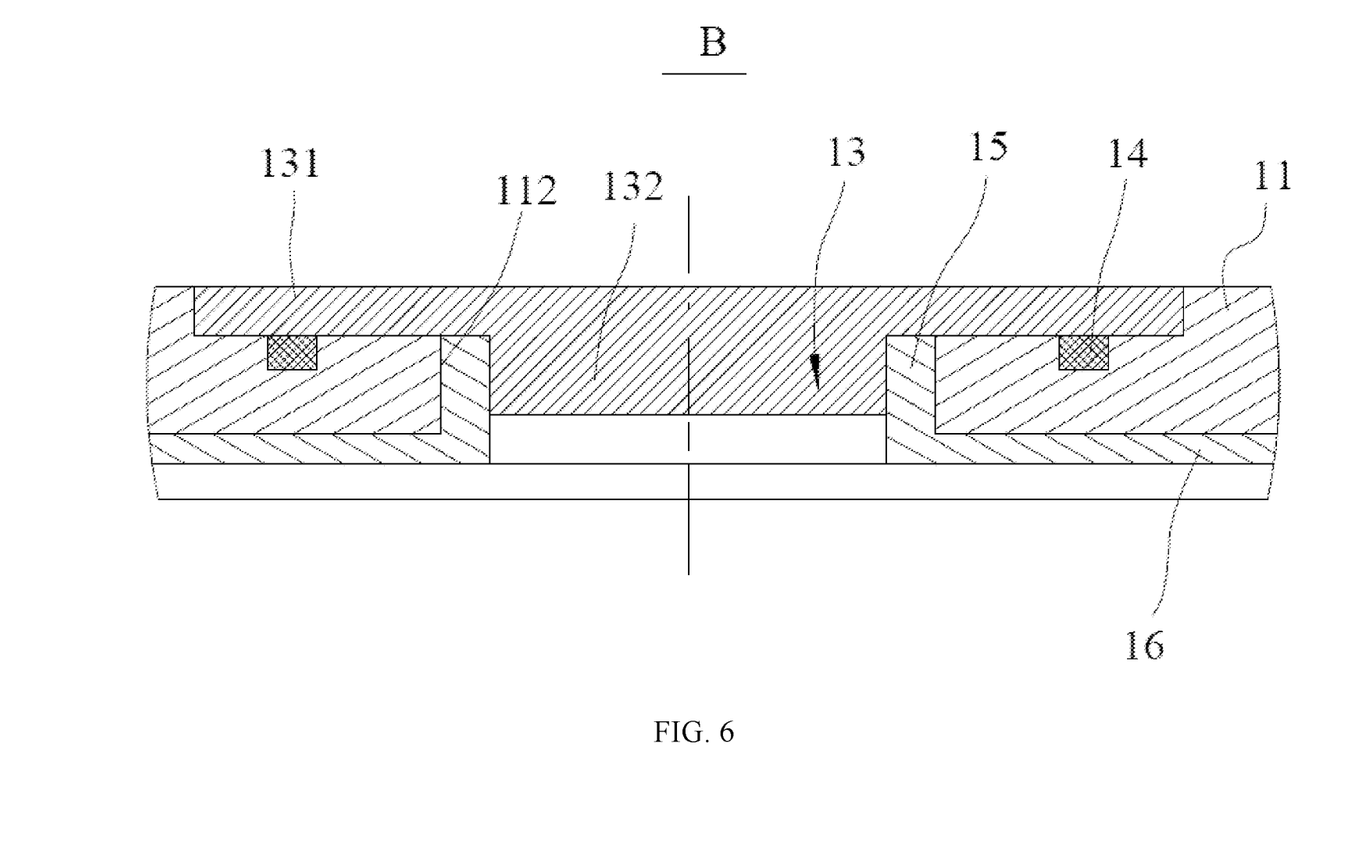
FIG. 6 is an enlarged view of position B in FIG. 5.

To resolve this problem, an embodiment of this application provides a cover assembly 1 of the secondary battery 100. FIG. 4 is a main view of a cover assembly of a secondary battery according to an embodiment of this application. FIG. 5 is a cross-sectional view of FIG. 4 in an A-A direction. FIG. 6 is an enlarged view of position B in FIG. 5.

As shown in FIGS. 3 to 6, the cover assembly 1 includes a cover plate 11, a blocker 13, a sealing member 14, and a fastener 15.

The cover plate 11 has an air hole 112, and the blocker 13 extends into and blocks the air hole 112. The sealing member 14 is disposed between the blocker 13 and the cover plate 11, surrounding the air hole 112 and configured to seal a gap between the blocker 13 and the cover plate 11. The fastener 15 is disposed inside the air hole 112. The fastener 15 is connected to the cover plate 11, and the blocker 13 is connected to the cover plate 11 through the fastener 15. The fastener 15 is configured to deform in response to a temperature rise, so that the blocker 13 stops blocking the air hole 112.

According to the cover assembly 1 of the secondary battery 100 provided in the embodiments of this application, the blocker 13 blocks the air hole 112, and the blocker 13 is connected to the cover plate 11 through the fastener 15. The fastener 15 is configured to deform in response to the temperature rise, so that the blocker 13 exits the state of blocking the air hole 112. The blocker 13 no longer blocks the air hole 112 as a temperature inside the housing 2 of the secondary battery 100 rises, so as to discharge gas from the housing 2 through the air hole 112. In this way, the secondary battery 100 can be prevented from an explosion because of reduced air pressure inside the housing 2, while partial heat can be taken away through gas discharge, thereby slowing down thermal runaway in the secondary battery 100 and providing enough escaping time for passengers.

The sealing member 14 is disposed between the blocker 13 and the cover plate 11, surrounding the air hole 112 and configured to seal the gap between the blocker 13 and the cover plate 11, thereby improving sealing performance of the blocker 13 to protect the secondary battery 100 in a normal working state from electrolyte leakage and prevent external water vapor from entering the housing 2, and further improving the safety performance and service life of the secondary battery 100.

Because the blocker 13 extends into and blocks the air hole 112, and the fastener 15 is disposed inside the air hole 112; therefore, the blocker 13 can securely block the air hole 112 and is not prone to falling off in a case of no thermal runaway in the secondary battery 100. Moreover, no additional fastening object such as a press block is required to secure the blocker 13, reducing occupation space and improving energy density of the secondary battery 100.

In a possible implementation, the fastener 15 has a melting point lower than that of the cover plate 11. For example, a material of the fastener 15 may be PP (polypropylene, polypropylene), PE (polyethylene, polyethylene), or the like. When the temperature inside the housing 2 exceeds the melting point of the fastener 15, the fastener 15 is deformed, that is, getting melted or softened. In this case, the blocker 13 exits the state of blocking the air hole 112, so that the air hole 112 is opened to discharge the gas inside the housing 2 of the secondary battery 100 out of the housing 2 through the air hole 112.

In a possible implementation, a melting point of the fastener 15 ranges from 80° C. to 200° C., and the blocker 13 is a metal block. The blocker 13 of a metal material can prevent water vapor or other gas outside the housing 2 from penetrating into the housing 2, and also prevent the electrolyte inside the housing 2 of the secondary battery 100 from permeating out of the housing 2, thereby improving the service life of the secondary battery 100.

In a possible implementation, as shown in FIG. 6, the blocker 13 includes a body 131 and a connection portion 132. The body 131 is flat-plate shaped, and the body 131 completely covers the air hole 112 and is located on an outer side of the cover plate 11. One end of the connection portion 132 is connected to the body 131, and the other end of the connection portion 132 extends into the air hole 112 and is connected to the fastener 15.

Completely covering the air hole 112 by the body 131 can further prevent water vapor or other gas outside the housing 2 from penetrating into the housing 2, and further prevent the electrolyte in the housing 2 of the secondary battery 100 from permeating out of the housing 2. The other end of the connection portion 132 extends into the air hole 112 and is connected to the fastener 15, so that the blocker 13 can be securely connected to the air hole 112, not requiring an additional fastening object. This reduces space of the secondary battery 100 and improves energy density of the secondary battery 100.

Figure 7:
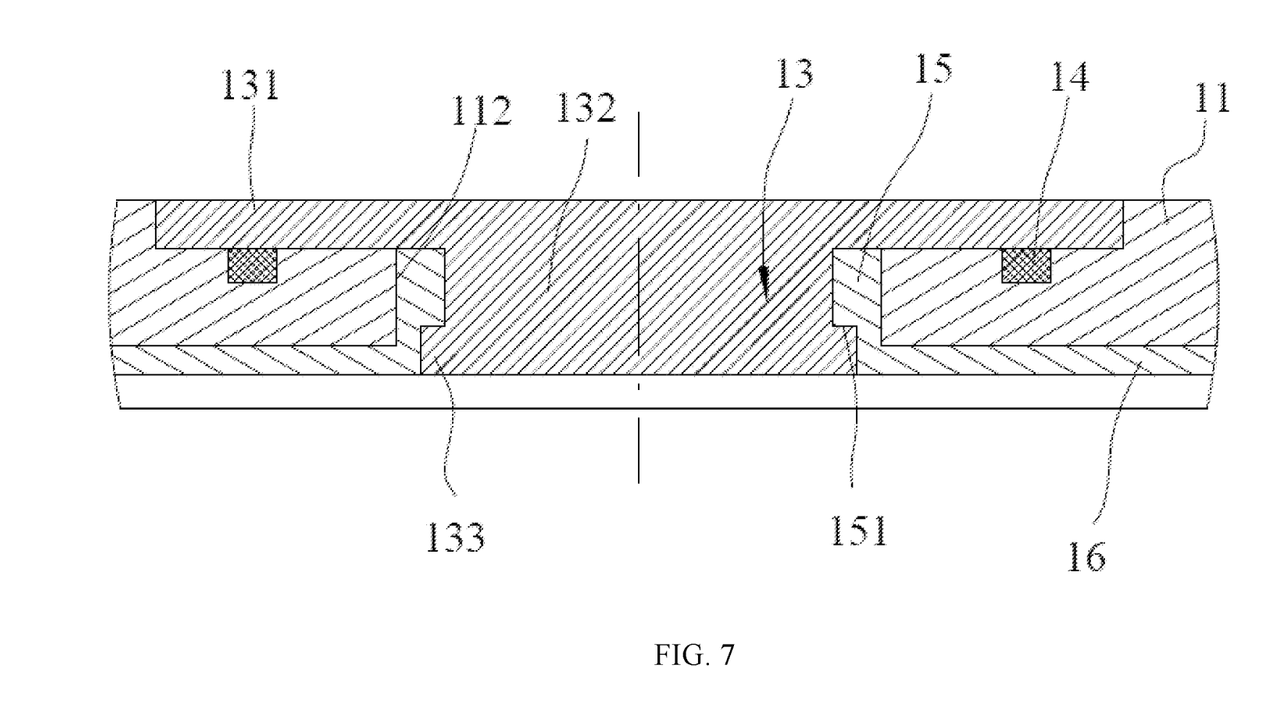
FIG. 7 is a schematic diagram of fitting another type of blocker to a cover plate and a fastener.
Figure 8:
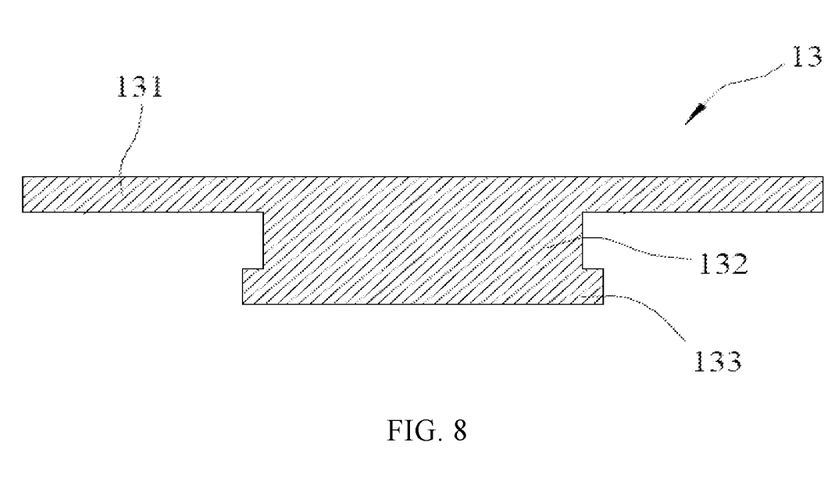
FIG. 8 is a main cross-sectional view of a structure of another type of blocker.

FIG. 7 is a schematic diagram of fitting another type of blocker to a cover plate and a fastener. FIG. 8 is a main cross-sectional view of a structure of another type of blocker. As shown in FIGS. 7 and 8, in a possible implementation, the blocker 13 further includes a limiting element 133. The limiting element 133 is connected to an end of the connection portion 132 facing away from the body 131. A limiting step 151 is disposed on a side of the fastener 15 facing away from the body 131. The limiting element 133 abuts against the limiting step 151.

The limiting element 133 may be formed by riveting. In a case of no thermal runaway in the secondary battery 100, disposition of the limiting element 133 can prevent the body 131 and the connection portion 132 from falling off the air hole 112.

In a possible implementation, both the connection portion 132 and the limiting element 133 have an annular structure. An outer diameter of the limiting element 133 is greater than an outer diameter of the connection portion 132. Correspondingly, the air hole 112 is a circular hole, and the connection portion 132 is fitted to the air hole 112. The limiting element 133 may be formed by riveting and abut against the limiting step 151. Because the outer diameter of the limiting element 133 is greater than the outer diameter of the connection portion 132, the body 131 and the connection portion 132 can be prevented from falling off the air hole 112 in a case of no thermal runaway in the secondary battery 100.

In a possible implementation, a projection of the limiting element 133 along a thickness direction Z of the cover assembly 1 is within a projection of the air hole 112 along the thickness direction Z of the cover assembly 1. Specifically, when the limiting element 133 has an annular structure, the outer diameter of the limiting element 133 is smaller than an aperture of the air hole 112. In this way, when the fastener 15 becomes deformed in response to a temperature rise, the blocker 13 is able to fall off the air hole 112, instead of interfering with the air hole 112 to affect gas discharge.

Figure 9:
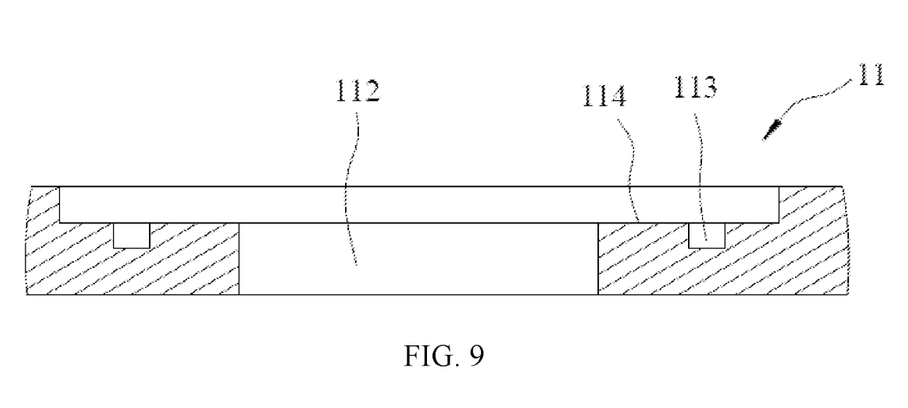
FIG. 9 is a schematic diagram of a partial structure of the cover plate in FIG. 7.

FIG. 9 is a schematic diagram of a partial structure of the cover plate in FIG. 7. As shown in FIG. 9, in a possible implementation, an annular sink 114 is provided in the cover plate 11. The sink 114 surrounds the air hole 112 and extends along a radial direction of the air hole 112. The body 131 is accommodated in the sink 114.

The annular sink 114 is provided on the cover plate 11, so that the body 131 is accommodated in the sink 114. In this way, the body 131 of the blocker 13 does not occupy excessive space outside the cover plate 11, conducive to weight reduction and miniaturization of the secondary battery 100.

In a possible implementation, as shown in FIG. 9, an annular groove 113 is provided in the cover plate 11. The groove 113 surrounds the air hole 112 and recesses from a bottom surface of the sink 114 towards a side facing away from the body 131. At least a part of the sealing member 14 is accommodated in the groove 113.

The annular groove 113 is provided on the cover plate 11, so that at least a part of the sealing member 14 is accommodated in the groove 113. In this way, the sealing member 14 does not occupy excessive space outside the cover plate 11, conducive to weight reduction and miniaturization of the secondary battery 100. The sealing member 14 does not occupy space on a side, close to the electrode assembly 3, inside the cover plate 11, thereby improving the energy density of the secondary battery 100.

In a possible implementation, the cover assembly 1 further includes an insulation plate 16. The insulation plate 16 is disposed on an inner side of the cover plate 11; and the fastener 15 and the insulation plate 16 are integrally formed.

The insulation plate 16 can insulate and isolate the cover plate 11 from the electrode assembly 3 in the housing 2. The fastener 15 and the insulation plate 16 are integrally formed, simplifying a process. In one embodiment, the fastener 15 and the insulation plate 16 are integrally formed by using a same material. In another embodiment, the fastener 15 and the insulation plate 16 are integrally formed by using different materials.

In some embodiments, an electric apparatus includes the aforementioned secondary battery.

The foregoing is merely optional embodiments of this application, and is not intended to limit this application. A person skilled in the art understands that this application may have various modifications and variations. Any modification, equivalent replacement, or improvement made without departing from the spirit and principle of this application shall fall within the protection scope of this application.

What is claimed is:

1. A cover assembly of a secondary battery, comprising:
   a cover plate with an air hole;
   a blocker inserted into and blocking the air hole;
   a sealer disposed between the blocker and the cover plate, surrounding the air hole, to seal a gap between the blocker and the cover plate; and
   a fastener disposed inside the air hole, wherein the fastener is connected to the cover plate, the blocker is connected to the cover plate through the fastener, and the fastener is configured to thermally deform in response to a temperature rise, so that the blocker stops blocking the air hole,
   wherein an insulating plate is disposed on an inner side surface of the cover plate facing an electrode assembly, and the fastener and the insulation plate are integrally formed using a same material.

2. The cover assembly according to claim 1, wherein a melting point of the fastener ranges from 80° C. to 200° C., and the blocker is a metal block.

3. The cover assembly according to claim 2, wherein the blocker comprises a body and a connection portion;

the body is flat-plate shaped, and the body completely covers the air hole and is located on an outer side of the cover plate; and one end of the connection portion is connected to the body, and the other end of the connection portion extends into the air hole and is connected to the fastener.

4. The cover assembly according to claim 3, wherein the blocker further comprises a limiting element;

the limiting element is connected to an end of the connection portion facing away from the body;

a limiting step is disposed on a side of the fastener facing away from the body; and the limiting element abuts against the limiting step.

5. The cover assembly according to claim 4, wherein both the connection portion and the limiting element have an annular structure; and an outer diameter of the limiting element is greater than an outer diameter of the connection portion.

6. The cover assembly according to claim 4, wherein a projection of the limiting element along a thickness direction of the cover assembly is within a projection of the air hole along the thickness direction of the cover assembly.

7. The cover assembly according to claim 5, wherein a projection of the limiting element along a thickness direction of the cover assembly is within a projection of the air hole along the thickness direction of the cover assembly.

8. The cover assembly according to claim 3, wherein an annular sink is provided in the cover plate;

the sink surrounds the air hole and extends along a radial direction of the air hole; and the body is accommodated in the sink.

9. The cover assembly according to claim 8, wherein an annular groove is provided in the cover plate;

the groove surrounds the air hole and recesses from a bottom surface of the sink towards a side facing away from the body; and at least a part of the sealer is accommodated in the groove.

10. The cover assembly according to claim 1, wherein the cover assembly further comprises an insulation plate, and the insulation plate is disposed on an inner side of the cover plate; and the fastener and the insulation plate are integrally formed.

11. A secondary battery, comprising:

a housing having an opening;

an electrode assembly accommodated in the housing; and a cover assembly, wherein the cover assembly covers the opening of the housing to contain the electrode assembly inside the housing, and the cover assembly further comprises:

a cover plate with an air hole;

a blocker inserted into and blocking the air hole;

a sealer disposed between the blocker and the cover plate, surrounding the air hole, to seal a gap between the blocker and the cover plate; and a fastener disposed inside the air hole, wherein the fastener is connected to the cover plate, the blocker is connected to the cover plate through the fastener, and the fastener is configured to create a thermal deformation in response to a temperature rise, so that the blocker stops blocking the air hole, wherein an insulating plate is disposed on an inner side surface of the cover plate facing the electrode assembly, and the fastener and the insulation plate are integrally formed using a same material.

12. The secondary battery according to claim 11, wherein a melting point of the fastener ranges from 80° C. to 200° C., and the blocker is a metal block.

13. The secondary battery according to claim 12, wherein the blocker comprises a body and a connection portion;

the body is flat-plate shaped, and the body completely covers the air hole and is located on an outer side of the cover plate; and one end of the connection portion is connected to the body, and the other end of the connection portion extends into the air hole and is connected to the fastener.

14. The secondary battery according to claim 13, wherein the blocker further comprises a limiting element;

the limiting element is connected to an end of the connection portion facing away from the body;

a limiting step is disposed on a side of the fastener facing away from the body; and the limiting element abuts against the limiting step.

15. The secondary battery according to claim 14, wherein both the connection portion and the limiting element have an annular structure; and an outer diameter of the limiting element is greater than an outer diameter of the connection portion.

16. The secondary battery according to claim 14, wherein a projection of the limiting element along a thickness direction of the cover assembly is within a projection of the air hole along the thickness direction of the cover assembly.

17. The secondary battery according to claim 13, wherein an annular sink is provided in the cover plate;

the sink surrounds the air hole and extends along a radial direction of the air hole; and the body is accommodated in the sink.

18. The secondary battery according to claim 17, wherein an annular groove is provided in the cover plate;

the groove surrounds the air hole and recesses from a bottom surface of the sink towards a side facing away from the body; and at least a part of the sealer is accommodated in the groove.

19. The secondary battery according to claim 11, wherein the cover assembly further comprises an insulation plate, and the insulation plate is disposed on an inner side of the cover plate; and the fastener and the insulation plate are integrally formed.

20. An electric apparatus, comprising a secondary battery according to claim 11.

* * * * *